United States Patent
Goodwin, III (10) Patent No.: US 6,442,531 B1
(45) Date of Patent: *Aug. 27, 2002

(54) METHOD OF CHANGING AN ELECTRONIC PRICE LABEL DISPLAY SEQUENCE

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/377,930

(22) Filed: Aug. 20, 1999

(51) Int. Cl.[7] .............................................. G06F 17/60
(52) U.S. Cl. ............................ 705/20; 705/16; 705/21; 705/27; 705/400; 340/825.35
(58) Field of Search .............................. 705/20–23, 27, 705/400, 16; 340/825.35

(56) References Cited

U.S. PATENT DOCUMENTS

| | | |
|---|---|---|
| 4,002,886 A | 1/1977 | Sundelin |
| 4,500,880 A | 2/1985 | Gomersall et al. |
| 4,924,363 A | 5/1990 | Kornelson |
| 5,172,314 A | 12/1992 | Poland et al. |
| 5,448,226 A | 9/1995 | Failing, Jr. et al. |
| 5,632,010 A * | 5/1997 | Briechle et al. ............... 705/20 |
| 5,794,211 A | 8/1998 | Goodwin, III et al. |
| 5,933,813 A * | 8/1999 | Teicher et al. ................. 705/26 |
| 6,021,395 A * | 2/2000 | Goodwin, III ................ 705/20 |

FOREIGN PATENT DOCUMENTS

JP 5-108966 * 4/1993 .................. 705/20

OTHER PUBLICATIONS

Chain Store Age Executive with Shopping Center Age, v70, n8, p38, Aug. 1994., "Trying again, with less hype: electronic marking efforts continue".*

* cited by examiner

Primary Examiner—Richard Chilcot
(74) Attorney, Agent, or Firm—Paul W. Martin; Priest & Goldstein, PLLC (57) ABSTRACT

An electronic price label (EPL) display sequence change method which conserves system bandwidth. The method determines a number of pieces of information which are currently stored within a memory in an EPL which contains a plurality of different locations for storing the pieces of information. The method further determines a first sequence by which the EPL currently displays the pieces of information in the different locations. The method further determines a second sequence to replace the first sequence, creates a message addressed to the EPL containing a command to execute the second sequence, and sends the message to the EPL.

11 Claims, 8 Drawing Sheets

METHOD OF CHANGING AN ELECTRONIC PRICE LABEL DISPLAY SEQUENCE

CROSS-REFERENCE TO RELATED APPLICATIONS

The present invention is related to the following commonly assigned and co-pending U.S. applications:

"Method of Displaying Temporary Information By An Electronic Price Label", filed Dec. 4, 1998, invented by Goodwin, and having a Ser. No. 09/205,739; and "System and Method of Sending Messages to a Group of Electronic Price Labels", filed Oct. 7, 1998, invented by Goodwin, and having a Ser. No. 09/167,897.

BACKGROUND OF THE INVENTION

The present invention relates to electronic price label (EPL) systems, and more specifically to a method of changing an EPL display sequence.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs are also being used to display more than just price information. Retailers are using EPLs to display promotional information in order to more effectively market associated merchandise items. A typical marketing strategy is to define groups of merchandise items to which the retailer can tailor its promotion and pricing policies. During off-peak hours, retailers display inventory and status information for the benefit of employees. EPLs may be programmed to display more than one type of information in sequences using flashing and scheduling techniques.

EPLs typically include a memory for storing operating information, display information, and instructions. This memory typically includes a plurality of data registers. A typical EPL with an eight-character liquid crystal display requires one data register for storing display information.

However, EPLs have limited memory capacity for storing the many types of information which must be displayed. A typical EPL has four data registers which can simultaneously store, at most, two types of information.

Also, in a system which includes EPLs having limited memory capacity, sending new data to an EPL with an instruction to display the new data eats up bandwidth and requires additional communication time than would be required to send only the instruction.

In order to temporarily change information displayed by an EPL, a message containing the temporary information must be sent to the EPL. Following expiration of the temporary period, a message containing the originally displayed information must be sent to the EPL. In total, two messages containing the originally displayed information must be sent to the EPL, one before the temporary change and one after the temporary change.

Therefore, it would be desirable to provide a method of changing an EPL display sequence for a single EPL or a group of EPLs which automatically manages addressing of messages to EPLs as promotion and pricing policies for the group change, despite the memory capacity limitation of an EPL. It would also be desirable to conserve EPL system bandwidth and change display sequences faster.

SUMMARY OF THE INVENTION

In accordance with the teachings of the present invention, a method of changing an electronic price label (EPL) display sequence is provided.

The EPL display sequence change method includes the steps of determining a number of pieces of information which are currently stored within a memory in an EPL, wherein the memory contains a plurality of different locations for storing the pieces of information; determining a first sequence by which the EPL currently displays the pieces of information in the different locations, including at least one piece of information; determining a second sequence to replace the first sequence; creating a message addressed to the EPL containing a command to execute the second sequence; and sending the message to the EPL.

The method of the present invention anticipates that certain pieces of information must be added to the memory. Thus, the method may further include the steps of determining whether the second sequence requires a new piece of information to be stored within the memory of the EPL; and if the new sequence requires a new piece of information to be stored within the memory of the EPL, creating a pre-load message containing the new data and instructions for storing the new data and sending the pre-load message to the EPL prior to sending the one message.

The method of the present invention further manages sequence changes for defined groups of EPLs. Thus, the method may further include the steps of determining a group of EPLs, wherein the EPLs in the group store the pieces of information in accordance with the first sequence; identifying the EPLs in the group, including the one EPL; and sending the message containing the second sequence to the EPLs in the group.

Advantageously, the method of the present minimizes storage problems in EPLs having limited memory capacity. The present invention automatically tracks and adds data and/or instructions which are not already in memory, but does so in a way that conserves system bandwidth and improves response time.

It is accordingly an object of the present invention to provide a method of changing an EPL display sequence.

It is another object of the present invention to change display sequences of groups of EPLs.

It is another object of the present invention to change display sequences of groups of EPLs.

It is another object of the present invention to change display sequences by adding information in memory in a way which conserves bandwidth.

It is another object of the present invention to provide a method of displaying a different type of information under a display sequence, by one or a group of EPLs, using a limited amount of EPL memory.

It is accordingly an object of the present invention to provide a method of displaying temporary information, by one or a group of EPLs.

It is another object of the present invention to provide a method of displaying temporary information, by one or a group of EPLs, which avoids having to send originally displayed information back to the one EPL or the group of EPLs after displaying the temporary information.

It is another object of the present invention to return one or a group of EPLs to a previous display state as quickly as possible.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
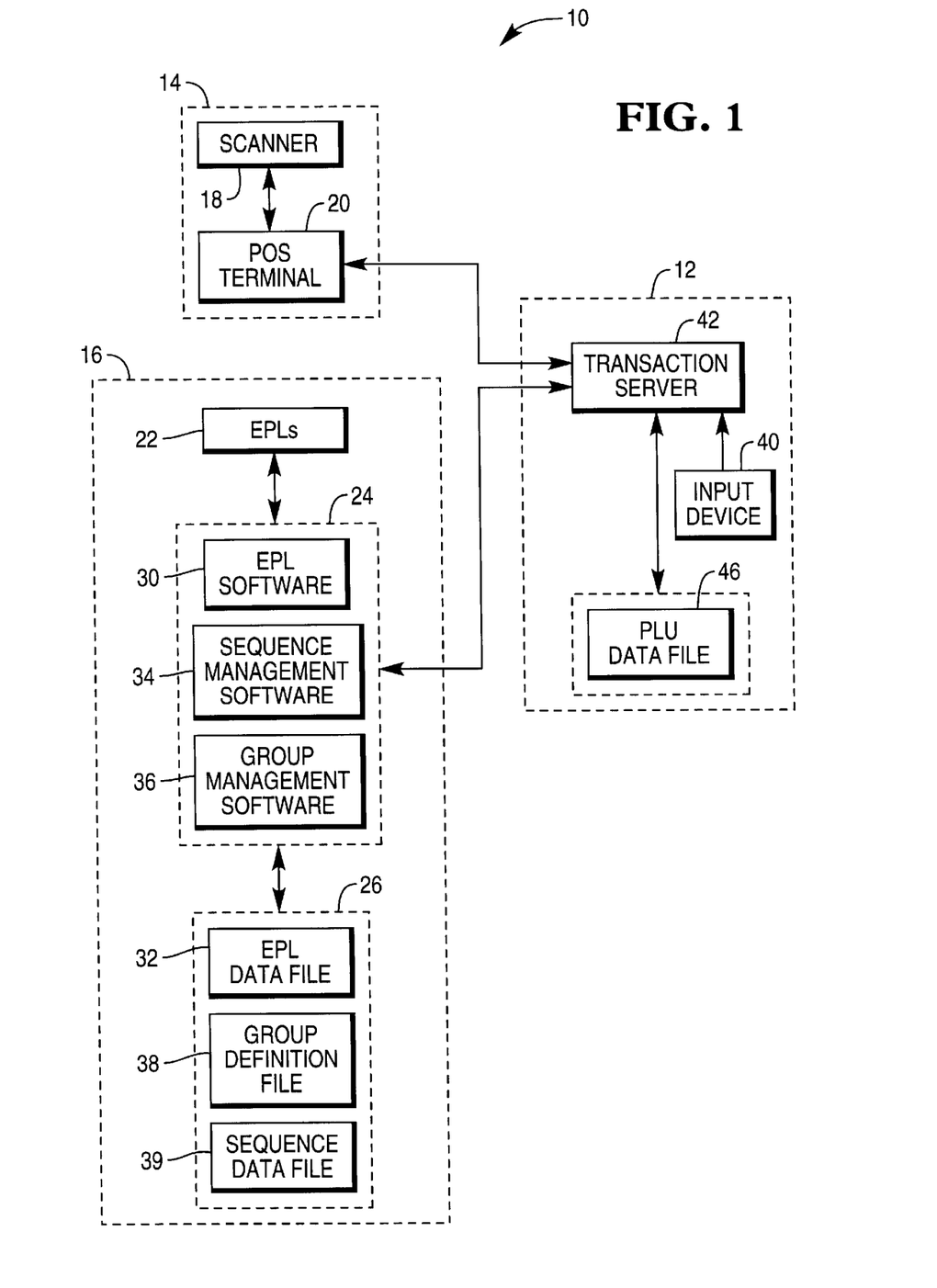
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and POS terminal 20.

EPL system 16 primarily includes EPLs 22, host EPL computer 24, and EPL storage medium 26.

Host EPL computer 24 executes EPL software 30. To assist with execution of certain tasks performed by EPL software 30, EPL computer 24 includes a built-in time keeping device, commonly referred to as a system clock, which is synchronized with current time, in order to automatically execute the tasks at their scheduled times.

EPL software 30 is responsible for scheduling and transmitting price data from EPL data file 32 to EPLs 22. EPL software 30 obtains prices in PLU data file 46 as they are entered in input device 40 (immediate processing) or after they have been stored within price look-up (PLU) data file 46.

Figure 2A:
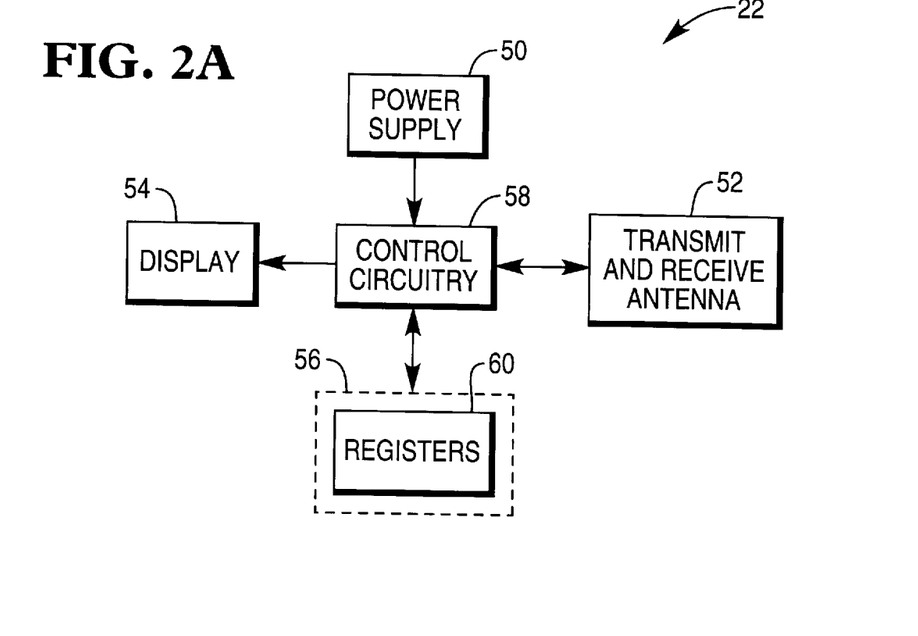
FIG. 2A is a block diagram of first type of EPL.
Figure 2B:
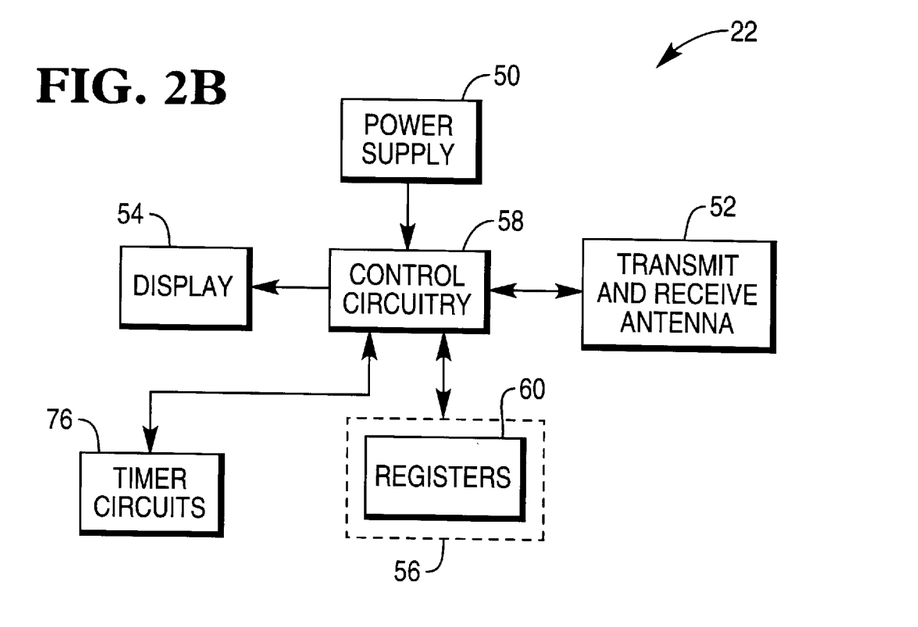
FIG. 2B is a block diagram of second type of EPL.

Host EPL terminal 24 also executes sequence management software 34 which manages display sequence changes. A display sequence instruction tells EPL 22s to display the contents of memory registers identified in the sequence instruction. Under the present invention, sequence management software 34 automatically or in response to operator-initiated commands changes display sequences. Sequence management software 34 may additionally send display data to the extent that a display sequence change calls for display data which is not already in memory 56 (FIG. 2), either before or with a change sequence message.

EPL terminal 24 also executes EPL group management software 36. EPL group management software 36 creates and manages group assignments for EPLs 22 through their associated merchandise items. An operator may directly input group assignments through input device 40. Alternatively, an operator may input group assignments through a batch file, or through a message.

Group assignments may be based upon any number of classifications. For example, group assignments may be based upon item categories or location or item department. One group might be all items "on sale" under special pricing or promotional terms on a predetermined day or all items "on sale" within a predetermined department or location. Thus, products and their EPLs 22 may be in more than one group.

If group messages must be sent, sequence management software 34 automatically or in response to operator input addresses the messages by reading all records in EPL group definition file 38. Operator input may be through input device 40, through a file, or through a message.

EPL storage medium 26 stores EPL data file 32, EPL group definition file 38, and sequence data file 39. EPL storage medium 26 and is preferably a fixed disk drive.

EPL data file 32 contains EPL identification and price checksum information. Price checksum information is calculated from price information in PLU data file 46. EPL data file 32 contains current information displayed by EPLs 22.

EPL group definition file 38 contains a list of groups and their identification numbers, as well as a table linking EPL identifiers to group identification numbers.

Sequence data file 39 contains sequence information for each EPL 22 that has a managed display sequence.

Files 32, 38, and 39 may be alternatively combined in various ways into one or more different files which collectively have similar content.

Input device 40 is preferably a keyboard.

Host computer system 12 includes PLU storage medium 44 and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Turning now to FIGS. 2A–2B, EPLs 22 each include power supply 50, transmit and receive antenna 52, display 54, memory 56, and control circuitry 58.

Power supply 50 provides power to each EPL 22. Power supply 50 may be a cable-provided power source or solar power source.

Transmit and receive antenna 52 receives and transmits messages to EPL computer 24.

Display 54 displays price, promotional, and other information in accordance with display sequence instructions. Display 54 is preferably a liquid crystal display (LCD).

Memory 56 includes a plurality of data registers 60.

Control circuitry 58 controls the internal operation of EPLs 22 and includes transceiver circuitry for communicating with EPL computer 24.

In particular, EPL circuitry 58 executes instructions from EPL computer 24 which designate information to be displayed. For example, one such instruction may be one which pre-loads data into memory 56. Another might be one which adds, removes, replaces, or restores display information in a display sequence.

Since one object of the present invention is too converse bandwidth, a pre-load message preferably precedes the change sequence message if the change sequence message includes instructions for displaying new information that is not already in memories 56.

If pre-load and display sequence change messages must be sent to groups of EPLs 22, sequence management software 34 formulates the messages and automatically addresses the messages by reading all records in EPL group definition file 38.

The embodiment of FIG. 2A requires a cancel or display sequence change message from EPL computer 24 containing a restore command to signal control circuitry 58 to restore the previous display sequence.

FIG. 2B differs from FIG. 2A in that EPL 22 additionally includes timer circuits 76 which signal control circuitry 58 to stop displaying information in accordance with one display sequence and return to displaying a previous display sequence.

Since only a single message is needed to convey display information to EPL 22 instead of two messages, this method saves bandwidth and quickens display changes. This method saves additional bandwidth and time because a cancel or subsequent display sequence change message is not required.

Figure 3A:
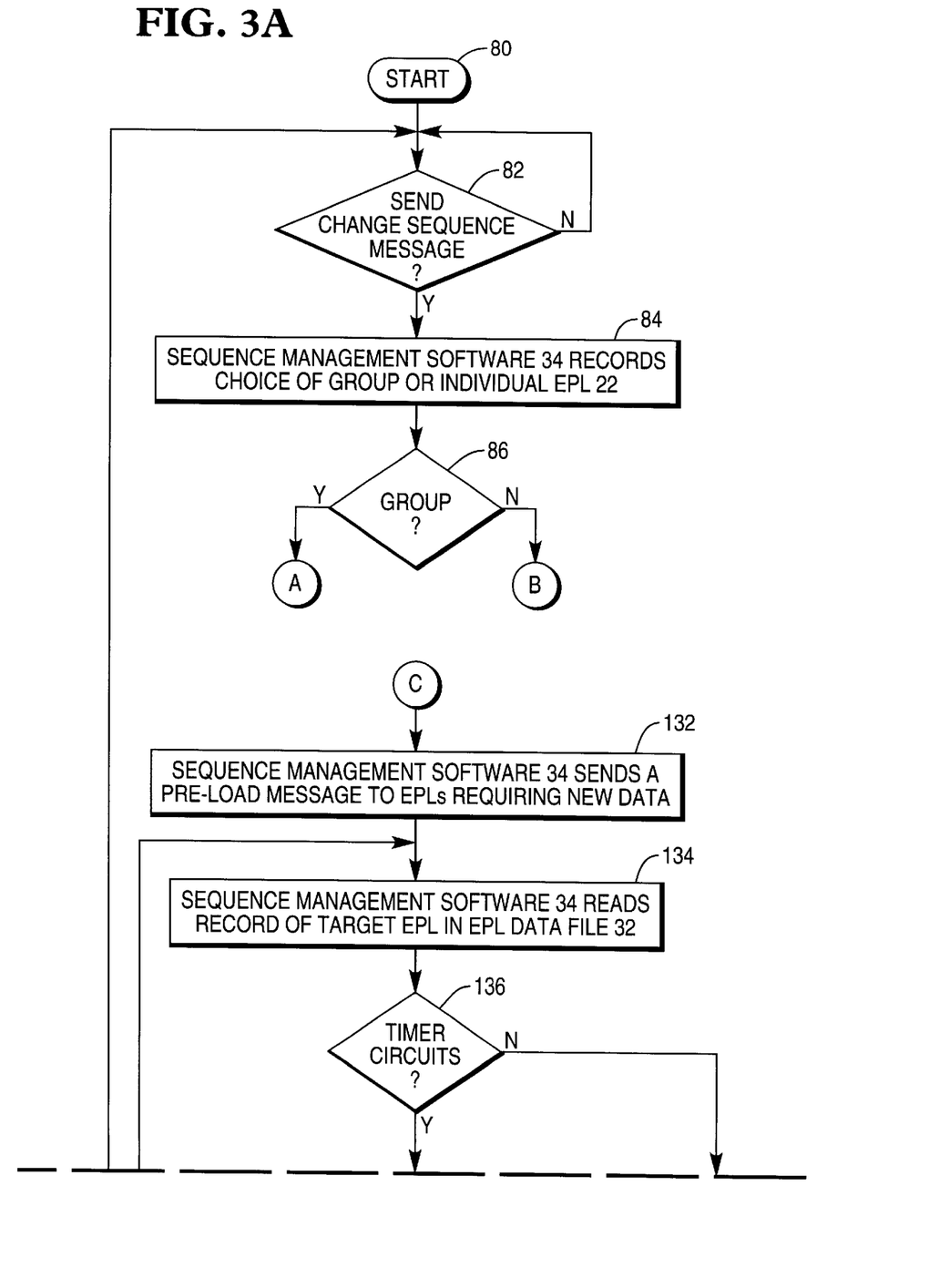
FIGS. 3A, 3B, 4A, 4B, 5A and 5B form a flow diagram illustrating the method of the present invention.
Figure 3B:
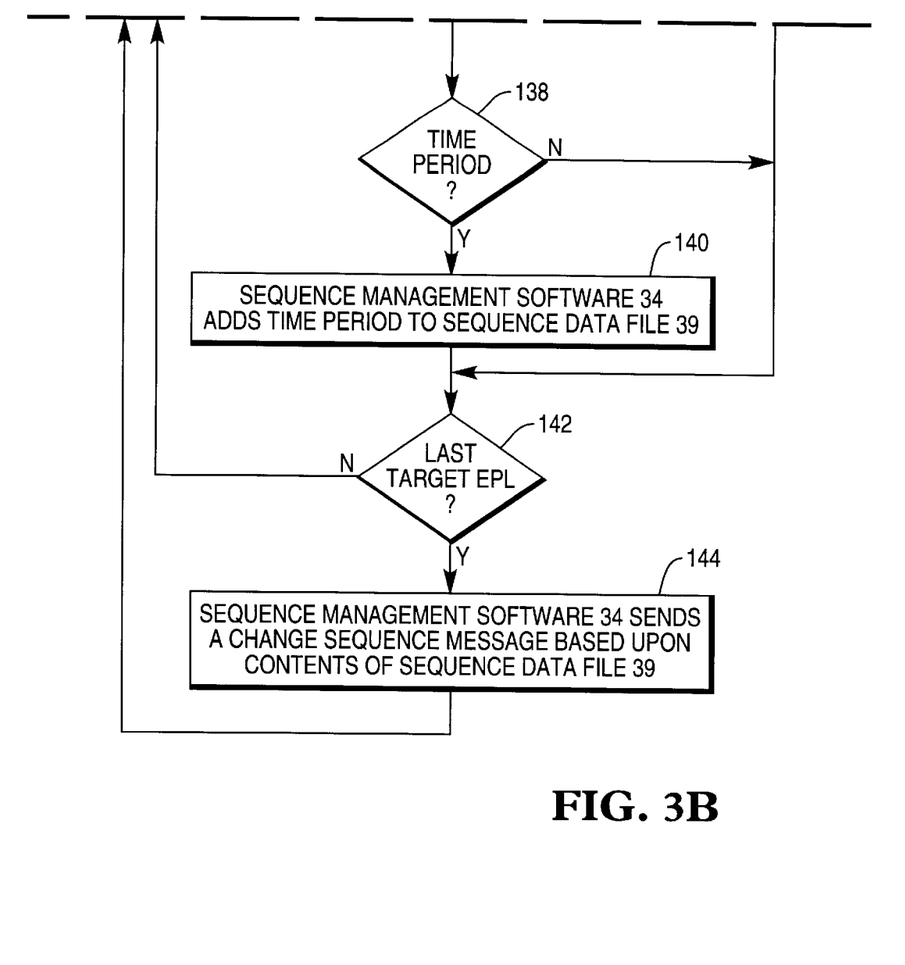
Figure 4A:
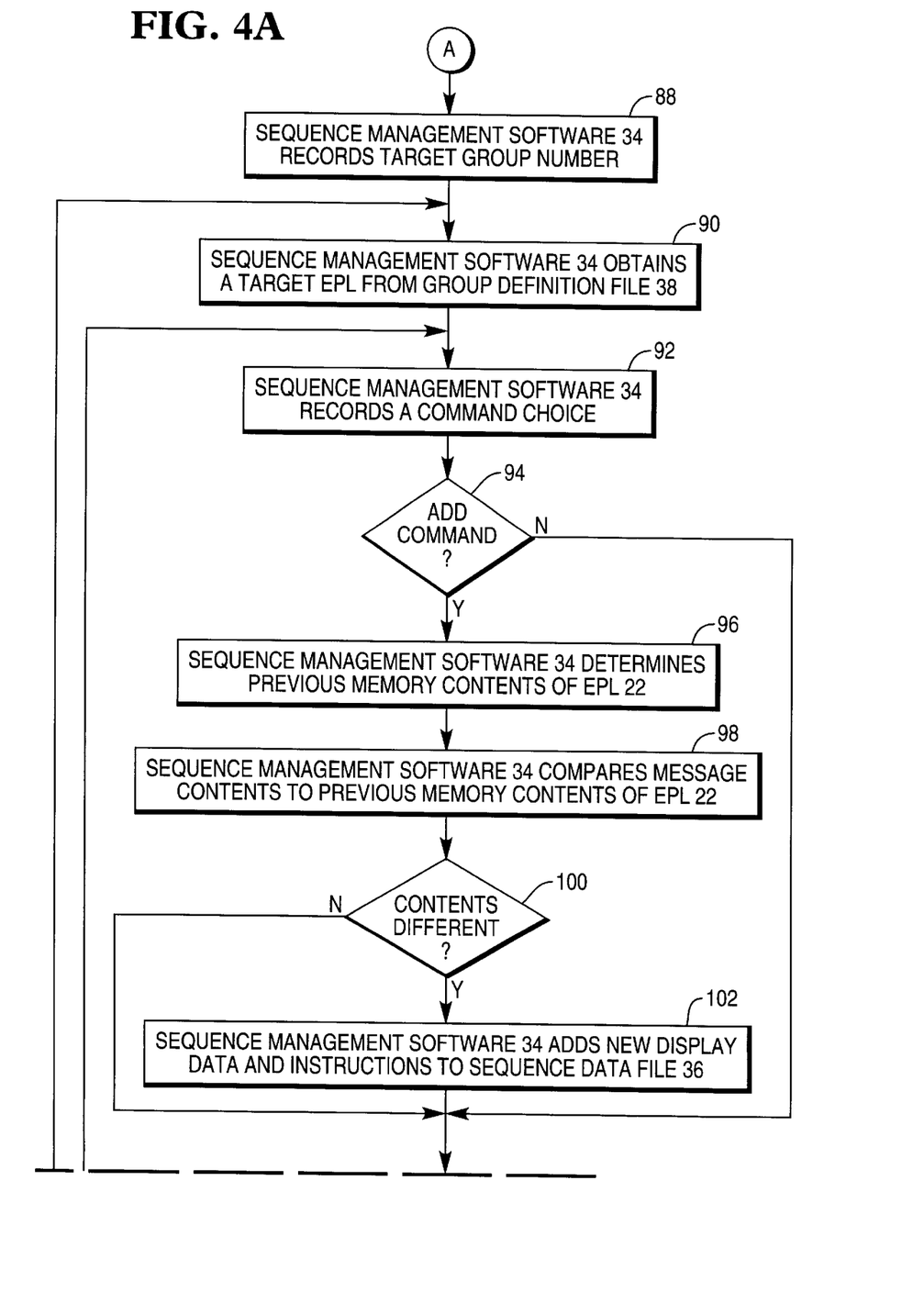
Figure 4B:
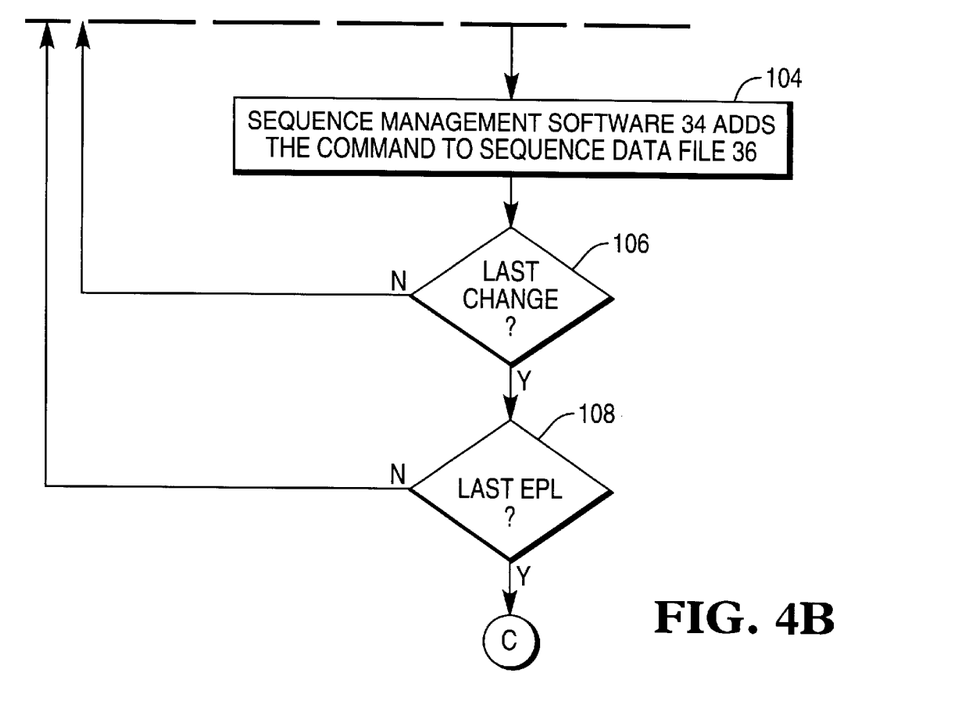
Figure 5A:
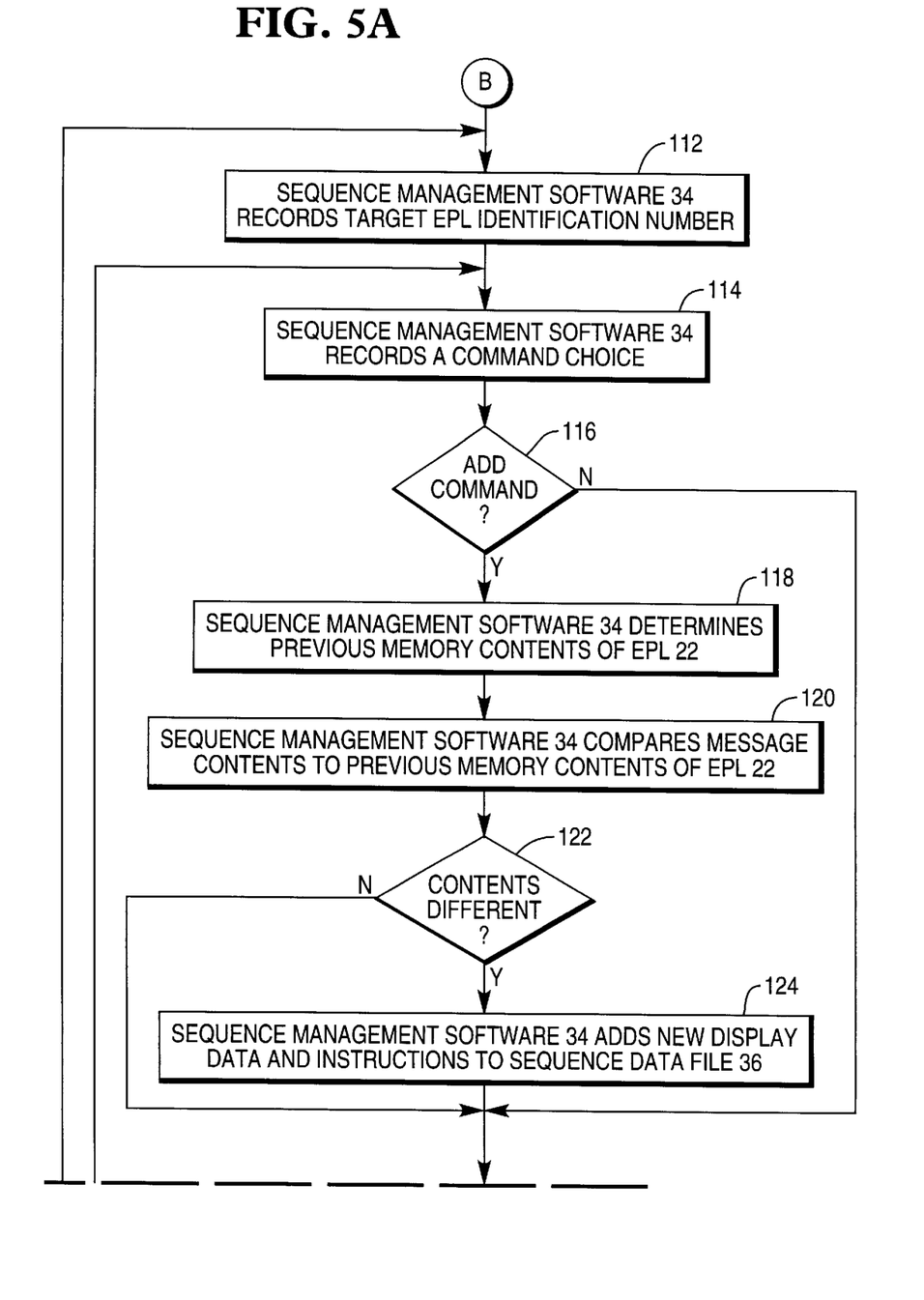
Figure 5B:
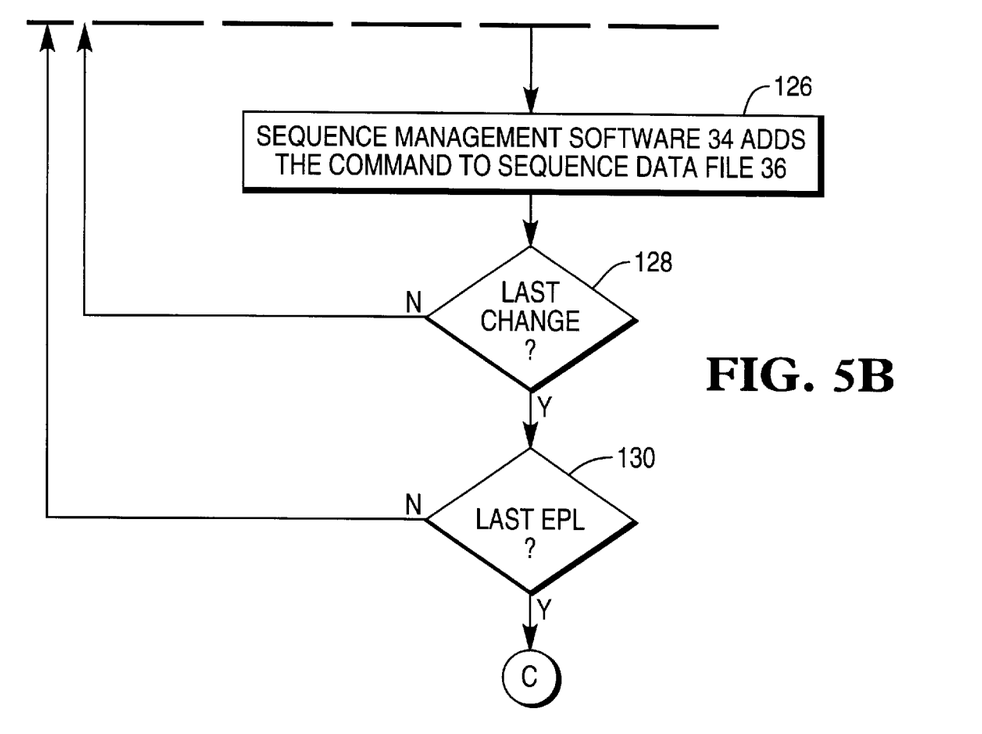

Turning now to FIGS. 3A–3C, a sequence management method illustrates modification of a display sequence beginning with START 80.

In step 82, sequence management software 34 waits for an indication to send a change sequence message to one or more EPLs 22. The indication may come from its own internal scheduler (automatic operation) or from operator action (manual operation).

In step 84, sequence management software 34 records a choice of either a group or individual EPL 22. Recordation may be accomplished in response to operator input, batch input, or message input.

In step 86, sequence management software 34 determines whether the choice was a group number. If so, operation proceeds to step 88 of FIG. 3B. If not, operation proceeds to step 112 of FIG. 3C.

Following the group and individual EPL processes of FIGS. 3B and 3C, operation returns to step 132 of FIG. 3A.

In step 132, sequence management software 34 sends a pre-load message to EPLs requiring new data. The message may be a broadcast message or an individually-addressed message. The pre-load message also contains instructions to control circuitry 58 to store it in a particular memory register 60.

Before sending the change display sequence message, sequence management software 34 examines each target EPL 22 in sequence data file 39 for timer circuits 76. If a target EPL 22 has timer circuits 76, sequence management software 34 records a time period for displaying the sequence, if necessary.

In step 134, sequence management software 34 examines a record of target EPL 22 in EPL data file 32.

In step 136, sequence management software 34 determines whether the target EPL 22 has timer circuits 76. If so, operation continues at step 138. If not, operation proceeds to step 142.

In step 138, sequence management software 34 determines whether timing instructions are to be recorded. Recordation may be accomplished in response to operator input, batch input, or message input. If so, operation proceeds to step 140. Otherwise, operation proceeds to step 142. If the display sequence change is permanent, then a preset time period is not included.

In step 140, sequence management software 34 adds timing instructions to the EPL record in sequence data file 39.

In step 142, sequence management software 34 determines whether the target EPL is the last target EPL. If so, operation proceeds to step 144. If not, operation returns to step 134.

In step 144, sequence management software 34 sends a change sequence message based upon the information stored within sequence data file 39. The message may be a broadcast message or an individually-addressed message. Operation returns to step 82. The change sequence message would include commands to control circuitry 58 for changing the display sequence, such as commands that add, remove, replace, or restore display data to a display sequence. The change sequence message could have additional instructions, such as flashing and timer instructions.

If target EPLs 22 have timer circuits 76, then such EPLs may automatically return to a previous display sequence after a preset time period, if one was contained in the display sequence change message.

If target EPLs 22 do not have timer circuits 76, then temporary display sequence changes must be followed by another display sequence change message.

Turning now to FIG. 3B, processing of display sequence changes of groups of EPLs 22 is illustrated in detail beginning with step 88.

In step 88, sequence management software 34 records a target group number. Recordation may be accomplished in response to operator input, batch input, or message input.

In step 90, sequence management software 34 obtains an EPL identification number from EPL group definition file 38.

In step 92, sequence management software 34 records a command choice. Recordation may be accomplished in response to operator input, batch input, or message input.

In step 94, sequence management software 34 determines whether the sequence change involves an Add command in which new data must be sent to EPL 22. If so, operation proceeds to step 96. If not, operation proceeds to step 104.

In step 96, sequence management software 34 determines previous memory contents of EPL 22 from EPL data file 32.

In step 98, sequence management software 34 compares message contents to previous memory contents of EPL 22.

In step 100, sequence management software 34 determines whether the contents are different. If so, operation proceeds to step 102. If not, operation proceeds to step 104.

In step 102, sequence management software 34 adds new display data and instructions to sequence data file 39. Sequence management software 34 retrieves that data from its data source and places it in the message to EPL 22, along with a memory location for storing the data and an instruction to store the data in the memory location.

In step 104, sequence management software 34 adds the command to the record of EPL 22 in sequence data file 39.

In step 106, sequence management software 34 determines whether additional display sequence change commands should be sent to EPL 22. If so, operation returns to step 92. If not, operation proceeds to step 108.

In step 108, sequence management software 34 determines whether the EPL record is the last EPL record in the group. If not, operation returns to step 90 to process the next record until all records are examined. If so, operation proceeds to 132 of FIG. 3A.

Turning now to FIG. 3C, processing of display sequence changes of individual EPLs 22 is illustrated in detail beginning with step 112.

In step 112, sequence management software 34 records a target EPL identification number. Recordation may be accomplished in response to operator input, batch input, or message input.

In step 114, sequence management software 34 records a command choice. Recordation may be accomplished in response to operator input, batch input, or message input.

In step 116, sequence management software 34 determines whether the sequence change involves an Add command in which new data must be sent to EPL 22. If so, operation proceeds to step 118. If not, operation proceeds to step 126.

In step 118, sequence management software 34 determines previous memory contents of EPL 22 from EPL data file 32.

In step 120, sequence management software 34 compares message contents to previous memory contents of EPL 22.

In step 122, sequence management software 34 determines whether the contents are different. If so, operation proceeds to step 124. If not, operation proceeds to step 126.

In step 124, sequence management software 34 adds new display data and instructions to sequence data file 39. Sequence management software 34 retrieves that data from its data source and places it in the message to EPL 22, along with a memory location for storing the data and an instruction to store the data in the memory location.

In step 126, sequence management software 34 adds the command to the record of EPL 22 in sequence data file 39.

In step 128, sequence management software 34 determines whether additional display sequence change commands should be sent to EPL 22. If so, operation returns to step 114. If not, operation proceeds to step 130.

In step 130, sequence management software 34 determines whether the EPL record is the last EPL to be recorded. If not, operation returns to step 110 to process the next EPL. If so, operation proceeds to 132 of FIG. 3A.

For example, suppose that a first display sequence for a target EPL 22 includes only price information from a first register 60 in memory 56. In order to add a promotional message to the display sequence, sequence management software 34 determines whether the promotional information is already stored within memory 56 by examining EPL data file 32. If the promotional information is not stored within memory 56, then a change sequence message to EPL 22 would contain the promotional data and instructions to control circuitry 52 to store it in a particular memory register. The change sequence message would also require an Add command. The Add command tells control circuitry 52 to display the promotional information as well as the price information. The change sequence message could have additional instructions, such as flashing instructions. If the promotional information is already stored within memory 56, then the change sequence message would only require an Add command.

As another example, suppose that a first display sequence for a target group of EPLs 22, such as "Tuesday specials", includes three types of display information: price information, first promotional information (e.g., "LOW FAT"), and second promotional information (e.g., "SALE"). The current display sequence includes instructions for displaying only the first and second promotional information. In order to add the third promotional information to the display sequence, sequence management software 34 would send an Add command to each EPL in the group.

Although the present invention has been described with particular reference to certain preferred embodiments thereof, variations and modifications of the present invention can be effected within the spirit and scope of the following claims. For example, EPL group management software 36 and EPL action software 38 may be a single application.

What is claimed is:

1. An electronic price label (EPL) display sequence change method comprising the steps of:
   (a) determining a number of pieces of information which are currently stored within a memory in an EPL, wherein the memory contains a plurality of different locations for storing the pieces of information;
   (b) determining a first sequence by which the EPL currently displays the pieces of information in the different locations, including at least one piece of information;
   (c) determining a second sequence to replace the first sequence;
   (d) creating a message addressed to the EPL containing a command to execute the second sequence;
   (e) sending the message to the EPL;
   (f) determining whether the second sequence is a temporary sequence; and
   (g) if the second sequence is a temporary sequence, determining whether the EPL includes a timer circuit; and
   if the EPL contains a timer circuit, sending temporary period information defining the temporary period to the EPL as part of the message in step (d).

2. The electronic price label (EPL) display sequence change method as recited in claim 1, further comprising the steps of:
   (h) determining whether the second sequence requires a new piece of information to be stored within the memory of the EPL; and
   (i) if the new sequence requires a new piece of information to be stored within the memory of the EPL,
   creating a pre-load message containing the new data and instructions for storing the new data; and
   sending the pre-load message to the EPL prior to step (d).

3. The electronic price label (EPL) display sequence change method as recited in claim 1, further comprising the steps of:
   (h) determining a group of EPLs, wherein the EPLs in the group store the pieces of information in accordance with the first sequence;
   (i) identifying the EPLs in the group, including the one EPL; and
   (j) sending the message containing the second sequence to the EPLs in the group.

4. The electronic price label (EPL) display sequence change method as recited in claim 3, further comprising the steps of:
   (k) determining whether the second sequence requires a new piece of information to be stored within the memory of the EPLs in the group; and
   (l) if the new sequence requires a new piece of information to be stored within the memory of the EPLs in the group,
   creating a pre-load message containing the new data and instructions for storing the new data; and
   sending the pre-load message to the EPLs in the group prior to step (j).

5. An electronic price label (EPL) display sequence change method comprising the steps of:
   (a) determining a plurality of pieces of information which are currently stored within a memory in an EPL, wherein the memory contains a plurality of different locations for storing the pieces of information;

(b) determining a first sequence by which the EPL currently displays the plurality of pieces of information in the different locations;

(c) determining a second sequence to replace the first sequence;

(d) creating a message addressed to the EPL containing a command to execute the second sequence;

(e) sending the message to the EPL;

(f) determining whether the second sequence is a temporary sequence; and (g) if the second sequence is a temporary sequence, determining whether the EPL includes a timer circuit; and if the EPL contains a timer circuit, sending temporary period information defining the temporary period to the EPL as part of the message in step (d).

6. An electronic price label (EPL) display sequence change method comprising the steps of:

(a) determining a plurality of pieces of information which are currently stored within a memory in an EPL, wherein the memory contains a plurality of different locations for storing the pieces of information;

(b) determining a first sequence by which the EPL currently displays a number of the plurality of pieces of information in the different locations;

(c) determining a second sequence to replace the first sequence;

(d) creating a message addressed to the EPL containing a command to execute the second sequence;

(e) sending the message to the EPL;

(f) determining whether the second sequence is a temporary sequence; and (g) if the second sequence is a temporary sequence, determining whether the EPL includes a timer circuit; and if the EPL contains a timer circuit, sending temporary period information defining the temporary period to the EPL as part of the message in step (d).

7. An electronic price label (EPL) display sequence change method of comprising the steps of:

(a) determining a number of pieces of information which are currently stored within a memory in an EPL, wherein the memory contains a plurality of different locations for storing the pieces of information;

(b) determining a first sequence by which the EPL currently displays the pieces of information in the different locations, including at least one piece of information;

(c) determining a second sequence to replace the first sequence;

(d) determining whether the second sequence requires a new piece of information to be stored within the memory of the EPL;

(e) if the new sequence requires a new piece of information to be stored within the memory of the EPL,
creating a pre-load message containing the new data and instructions for storing the new data; and
sending the pre-load message to the EPL;

(f) creating a message addressed to the EPL containing a command to execute the second sequence;

(g) sending the message to the EPL;

(h) determining whether the second sequence is a temporary sequence; and (i) if the second sequence is a temporary sequence, determining whether the EPL includes a timer circuit; and if the EPL contains a timer circuit, sending temporary period information defining the temporary period to the EPL as part of the message in step (g).

8. An electronic price label (EPL) system comprising:

an EPL including a memory containing a plurality of different locations; and a computer which determines a number of pieces of information which are currently stored within the different locations of the memory of the EPL, determines a first sequence by which the EPL is currently displaying the pieces of information, determines a second sequence to replace the first sequence, creates a message addressed to the EPL containing a command to execute the second sequence, determines whether the second sequence is a temporary sequence, and if the second sequence is a temporary sequence, and if the EPL contains a timer circuit, sending temporary period information defining the temporary period to the EPL as part of the message.

9. The EPL system as recited in claim 8, wherein the computer also determines whether the second sequence requires a new piece of information to be stored within the memory of the EPL, and, if the new sequence requires a new piece of information to be stored within the memory of the EPL, creates a pre-load message containing the new data and instructions for storing the new data.

10. The EPL system as recited in claim 8, wherein the computer also determines whether the second sequence is a temporary sequence, and, if the second sequence is a temporary sequence, creates another message addressed to the EPL containing a command to execute the first sequence.

11. The EPL system as recited in claim 8, wherein the computer also determines a group of EPLs, identifies the EPLs in the group including the one EPL, and includes addresses of the EPLs in the one message.

* * * * *